(12) United States Patent
Kim et al.

(10) Patent No.: US 10,963,664 B2
(45) Date of Patent: Mar. 30, 2021

(54) SENSOR PANEL AND DISPLAY DEVICE INCLUDING THE SAME

(71) Applicant: LG Display Co., Ltd., Seoul (KR)

(72) Inventors: Chi-Wan Kim, Paju-si (KR); Yong-Su Ham, Paju-si (KR); Yong-Woo Lee, Paju-si (KR); Kyung-Yeol Ryu, Paju-si (KR); Yu-Seon Kho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/900,523

(22) Filed: Jun. 12, 2020

(65) Prior Publication Data
US 2020/0410195 A1 Dec. 31, 2020

(30) Foreign Application Priority Data
Jun. 27, 2019 (KR) .................. 10-2019-0076761

(51) Int. Cl.
*G06K 9/00* (2006.01)
*G06F 21/32* (2013.01)

(52) U.S. Cl.
CPC .......... *G06K 9/0002* (2013.01); *G06F 21/32* (2013.01)

(58) Field of Classification Search
CPC .............................. G06K 9/0002; G06F 21/32

USPC .......................................... 340/665
See application file for complete search history.

(56) References Cited

U.S. PATENT DOCUMENTS

| | | | |
|---|---|---|---|
| 2006/0285728 A1* | 12/2006 | Leung | G06K 9/0002 382/124 |
| 2011/0198484 A1* | 8/2011 | Kurokawa | H04N 5/3745 250/214 R |
| 2013/0038543 A1* | 2/2013 | Su | G06F 3/0446 345/173 |
| 2015/0193048 A1* | 7/2015 | Yang | G06F 3/0445 345/174 |
| 2017/0193262 A1* | 7/2017 | Lo | G01R 27/2605 |
| 2017/0351895 A1* | 12/2017 | Lundahl | G06K 9/0002 |
| 2017/0357838 A1* | 12/2017 | Chen | G06K 9/00 |
| 2018/0025197 A1* | 1/2018 | Lo | G06F 3/0443 382/124 |
| 2018/0101711 A1* | 4/2018 | D'Souza | G06K 9/228 |
| 2018/0321784 A1* | 11/2018 | Park | G06K 9/0002 |

* cited by examiner

*Primary Examiner* — Kerri L McNally
(74) *Attorney, Agent, or Firm* — Polsinelli PC

(57) ABSTRACT

A sensor panel includes a substrate; a sensing part on the substrate and including a plurality of sensors; and a partition wall between adjacent sensors, wherein each sensor includes a first sensor electrode, a piezoelectric layer and a second sensor electrode, and wherein the partition wall has a lower dielectric constant than the piezoelectric layer.

20 Claims, 8 Drawing Sheets

SENSOR PANEL AND DISPLAY DEVICE INCLUDING THE SAME

CROSS REFERENCE TO RELATED APPLICATION

This application claims priority from and the benefit of Korean Patent Application No. 10-2019-0076761 filed on Jun. 27, 2019, which is hereby incorporated by reference in its entirety.

BACKGROUND

Field of the Disclosure

The present disclosure relates to a display device, and more particularly, to a sensor panel with excellent security and high recognition rate and a display device including the same.

Description of the Background

With entering into a full-fledged information age, there is a growing interest in information display dealing with and displaying mass information. In response to this, various display devices with advantages of a thin thickness, light weight and low power consumption have been developed and have been in the spotlight.

The display devices are widely applied to electronic devices such as monitors of computers or televisions as well as portable electronic devices such as smart phones or tablet PCs to provide various types of information in various ways.

By the way, since the information provided by the display device of the electronic device personal information related to personal privacy or business information such as sales secret, it has been needed to strengthen security.

Password authentication has been widely used as an authentication method for security. However, since the password is easily leaked and is vulnerable to security, biometric technology for personal authentication and convenience has recently emerged as an alternative.

A capacitive or optical fingerprint sensor has been proposed as one of the biometric technologies. The capacitive or optical fingerprint sensor allows the use of an electronic device by the fingerprint, which is the user's biometric information, so that security can be strengthened as compared with the password authentication.

However, since the capacitive or optical fingerprint sensor recognizes the fingerprint in a two-dimensional method of storing an image, it is susceptible to external environmental conditions. Thus, it is difficult to recognize an accurate fingerprint and easy to forge due to low resolution. There is still a problem of low security.

SUMMARY

Accordingly, the present disclosure is directed to a sensor panel and a display device including the same that substantially obviates one or more of the problems due to limitations and disadvantages of the related art.

In addition, the present disclosure is to provide a sensor panel and a display device including the same that has the excellent security and high recognition rate.

Additional features and aspects will be set forth in the description which follows, and in part will be apparent from the description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these and other aspects of the inventive concepts, as embodied and broadly described herein, a sensor panel includes a substrate; a sensing part on the substrate and including a plurality of sensors; and a partition wall between adjacent sensors, wherein each sensor includes a first sensor electrode, a piezoelectric layer and a second sensor electrode, and wherein the partition wall has a lower dielectric constant than the piezoelectric layer.

As another aspect, a display device comprises a sensor panel including a substrate; a sensing part on the substrate and including a plurality of sensors; and a partition wall between adjacent sensors, wherein each sensor includes a first sensor electrode, a piezoelectric layer and a second sensor electrode, and wherein the partition wall has a lower dielectric constant than the piezoelectric layer; and a display panel on the sensor panel, wherein the sensing part is disposed between the substrate and the display panel.

It is to be understood that both the foregoing general description and the following detailed description are exemplary and explanatory, and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain various principles of the present disclosure.

In the drawings.

DETAILED DESCRIPTION

Reference will now be made in detail to example aspects of the disclosure, which are illustrated in the accompanying drawings.

Figure 1:
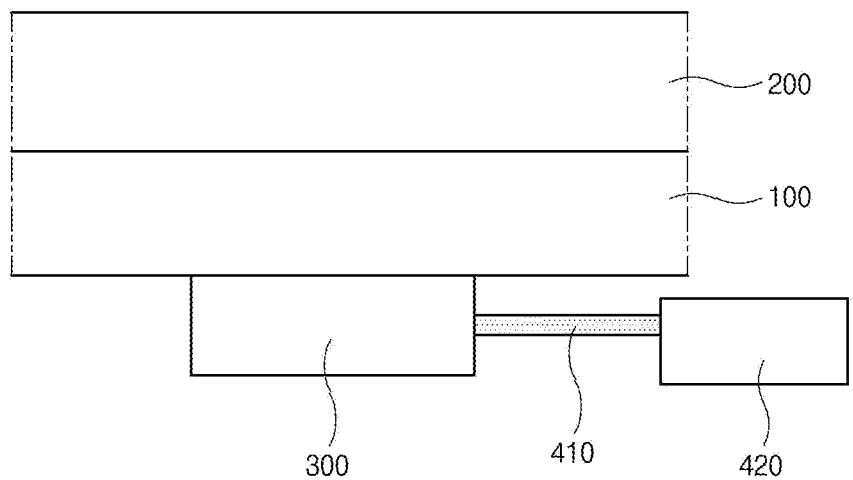
FIG. 1 is a cross-sectional view schematically illustrating a display device according to a first aspect of the present disclosure.

FIG. 1 is a cross-sectional view schematically illustrating a display device according to a first aspect of the present disclosure.

In FIG. 1, the display device according to the first aspect of the present disclosure includes a display panel 100, a cover window 200, a sensor panel 300, a flexible printed circuit 410 and a sensor driving part 420. Although not shown in the figure, the display device of the present disclosure may further include a driving part for driving the display panel 100.

Here, the display panel 100 includes a plurality of pixels and displays an image by selectively driving the plurality of pixels. The display panel 100 may be an electroluminescent display panel, and the structure of the display panel 100 will be described in detail later.

The cover window 200 is disposed at an upper surface of the display panel 100, that is, a first surface through which an image is outputted. The cover window 200 protects the display panel 100 from the external impacts. The cover window 200 may be attached to the display panel 100 through an adhesive layer (not shown).

The cover window 200 is formed of a transparent material. For example, the cover window 200 may be formed of glass or plastic, but is not limited thereto.

The sensor panel 300 is disposed at a lower surface of the display panel 100, that is, a second surface on the opposite side of the first surface. The sensor panel 300 may have a smaller size than the display panel 100 and may be attached to one side of the lower surface of the display panel 100. However, the present disclosure is not limited thereto.

Although not shown in the figure, the sensor panel 300 includes a plurality of sensors. Each sensor is an ultrasonic sensor that generates an ultrasonic wave by being supplied with voltage or generates a voltage change, that is, a capacitance change by sensing a reflected and/or diffracted ultrasonic wave. The structure of the sensor panel 300 including the ultrasonic sensor will be described in detail later.

The sensor panel 300 is connected to the sensor driving part 420 through the flexible printed circuit 410. The sensor driving part 420 may be configured as an integrated circuit (IC). The sensor driving part 420 may supply a voltage to each sensor of the sensor panel 300 or receive a change of a voltage generated from each sensor, thereby detecting desired information.

Figure 2:
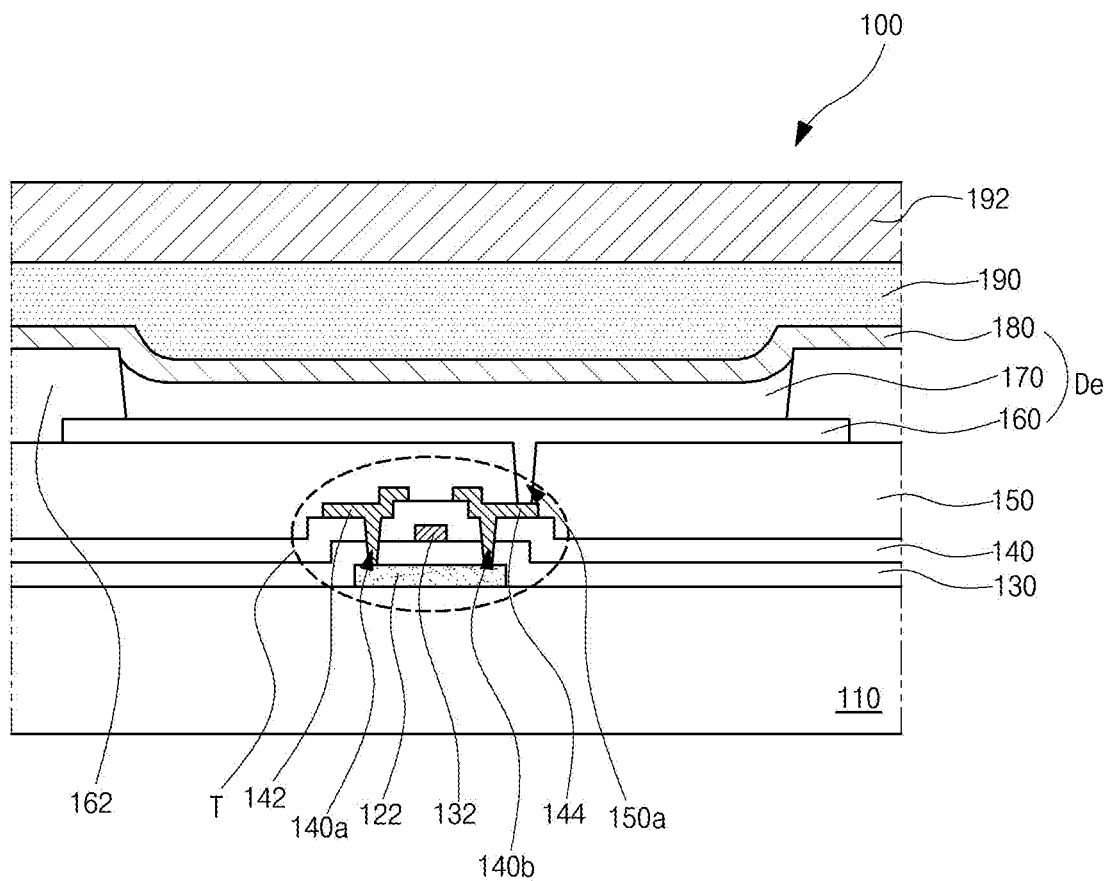
FIG. 2 is a schematic cross-sectional view of a display device according to the first aspect of the present disclosure.

FIG. 2 is a schematic cross-sectional view of a display device according to the first aspect of the present disclosure. As described above, the display panel 100 of the display device according to the first aspect of the present disclosure may be an electroluminescent display panel. The display panel 100 includes a plurality of pixels, and each pixel includes red, green and blue subpixels. Each subpixel has substantially the same structure, and FIG. 2 illustrates a subpixel region corresponding to each subpixel.

In FIG. 2, a patterned semiconductor layer 122 is formed on an insulation substrate 110. The insulation substrate 110 may be a glass substrate or a plastic substrate. For example, polyimide may be used for the plastic substrate, but is not limited thereto.

The semiconductor layer 122 may be formed of polycrystalline silicon, and in this case, both ends of the semiconductor layer 122 may be doped with impurities. Alternatively, the semiconductor layer 122 may be formed of an oxide semiconductor material.

Meanwhile, a buffer layer (not shown) may be further formed between the insulation substrate 110 and the semiconductor layer 122. The buffer layer may be formed of an inorganic insulating material such as silicon oxide ($SiO_2$) or silicon nitride (SiNx) and may be a single layer or a multiple layer.

A gate insulation layer 130 of an insulating material is formed on the semiconductor layer 122 substantially all over the insulation substrate 110. The gate insulation layer 130 may be formed of an inorganic insulating material such as silicon oxide ($SiO_2$) or silicon nitride (SiNx).

A gate electrode 132 of a conductive material such as metal is formed on the gate insulation layer 130 corresponding to a center of the semiconductor layer 122. In addition, a gate line (not shown) and a first capacitor electrode (not shown) may be formed on the gate insulation layer 130. The gate line extends in a first direction, and the first capacitor electrode is connected to the gate electrode 132.

For example, the gate electrode 132, the gate line and the first capacitor electrode may be formed of one or more of aluminum (Al), molybdenum (Mo), titanium (Ti), nickel (Ni), chromium (Cr), copper (Cu) and their alloys and may have a single-layered structure or a multiple-layered structure, but is not limited thereto.

Meanwhile, in the first aspect of the present disclosure, although the gate insulation layer 130 is formed substantially all over the insulation substrate 110, the gate insulation layer 130 may be patterned to have the same shape as the gate electrode 132.

An interlayer insulation layer 140 of an insulating material is formed on the gate electrode 132 substantially all over the insulation substrate 110. The interlayer insulation layer 140 may be formed of an inorganic insulating material such as silicon oxide ($SiO_2$) or silicon nitride (SiNx) or an organic insulating material such as photo acryl or benzocyclobutene.

The interlayer insulation layer 140 has first and second contact holes 140a and 140b exposing top surfaces of the both ends of the semiconductor layer 122. The first and second contact holes 140a and 140b are disposed at both sides of the gate electrode 132 and are spaced apart from the gate electrode 132. Here, the first and second contact holes 140a and 140b are formed in the gate insulation layer 130. Alternatively, when the gate insulation layer 130 is patterned to have the same shape as the gate electrode 132, the first and second contact holes 140a and 140b are formed only in the interlayer insulation layer 140.

Source and drain electrodes 142 and 144 of a conductive material such as metal are formed on the interlayer insulation layer 140. In addition, a data line (not shown), a power line (not shown) and a second capacitor electrode (not shown) may be formed on the interlayer insulation layer 140.

For example, the source and drain electrodes 142 and 144, the data line, the power line and the second capacitor electrode may be formed of one or more of aluminum (Al), molybdenum (Mo), titanium (Ti), nickel (Ni), chromium (Cr), copper (Cu) and their alloys and may have a single-layered structure or a multiple-layered structure, but is not limited thereto.

The source and drain electrodes 142 and 144 are spaced apart from each other with the gate electrode 132 disposed therebetween. The source and drain electrodes 142 and 144 contact the both ends of the semiconductor layer 122 through the first and second contact holes 140a and 140b, respectively. Although not shown in the figure, the data line extends in a second direction and crosses the gate line to define each subpixel region. The power line for supplying high potential voltage is spaced apart from the data line. The second capacitor electrode is connected the drain electrode 144 and overlaps the first capacitor electrode to form a storage capacitor with the interlayer insulation layer 140 therebetween as a dielectric. Alternatively, the first capacitor electrode may be connected to the drain electrode 144, and the second capacitor electrode may be connected to the gate electrode 132.

The semiconductor layer 122, the gate electrode 132, and the source and drain electrodes 142 and 144 constitute a thin film transistor T. Here, the thin film transistor T may have a coplanar structure in which the gate electrode 132 and the source and drain electrodes 142 and 144 are disposed at one side of the semiconductor layer 122, that is, over the semiconductor layer 122, but is not limited thereto.

The thin film transistor T corresponds to a driving thin film transistor. A switching thin film transistor (not shown) having the same structure as the driving thin film transistor T may be further formed in each subpixel region on the insulation substrate 110. At this time, the gate electrode 132 of the driving thin film transistor T may be connected to a drain electrode (not shown) of the switching thin film transistor, and the source electrode 142 of the driving thin film transistor T may be connected to the power line (not shown). In addition, a gate electrode (not shown) and a source electrode (not shown) of the switching thin film transistor may be connected to the gate line and the data line, respectively.

Meanwhile, one or more sensing thin film transistors having the same structure as the driving thin film transistor T may be further formed in each subpixel region on the insulation substrate 110, but is not limited thereto.

An overcoat layer 150 of an insulating material is formed on the source and drain electrodes 142 and 144 substantially all over the insulation substrate 110. The overcoat layer 150 may be formed of an organic insulating material such as photo acryl or benzocyclobutene. The overcoat layer 150 may have a flat top surface.

Furthermore, although not shown in the figure, an inorganic insulation layer may be further formed under the overcoat layer 150, that is, between the overcoat layer 150 and the thin film transistor T. The inorganic insulation layer may be formed of silicon oxide ($SiO_2$) or silicon nitride (SiNx).

The overcoat layer 150 has a drain contact hole 150a exposing the drain electrode 144. Here, the drain contact hole 150a may be spaced apart from the second contact hole 140b. Alternatively, the drain contact hole 150a may be formed directly over the second contact hole 140b.

A first electrode 160 of a conductive material having a relatively high work function is formed on the overcoat layer 150. The first electrode 160 is formed in each subpixel region and contacts the drain electrode 144 through the drain contact hole 150a. For example, the first electrode 160 may be formed of a transparent conductive material such as indium tin oxide (ITO) or indium zinc oxide (IZO), but is not limited thereto.

Meanwhile, the display panel 100 of the display device according to the first aspect of the present disclosure may be a top emission type in which light of a light-emitting diode is outputted toward a direction opposite the insulation substrate 110. Accordingly, the first electrode 160 may further include a reflective electrode or a reflective layer, which is formed of a metal material having relatively high reflectance, under the transparent conductive material layer. For example, the reflective electrode or the reflective layer may be formed of aluminum-palladium-copper (APC) alloy or silver (Ag). At this time, the first electrode 160 may have a triple-layered structure of ITO/APC/ITO or ITO/Ag/ITO, but is not limited thereto.

A bank 162 of an insulating material is formed on the first electrode 160. The bank 162 overlaps edges of the first electrode 160, covers the edges of the first electrode 160, and exposes a central portion of the first electrode 160. The bank 162 may be formed of an organic insulating material having a hydrophobic property. Alternatively, the bank 162 may be formed of an organic insulating material having a hydrophilic property and may be treated to have a hydrophobic property. However, the present disclosure is not limited thereto. Meanwhile, a bank having a hydrophilic property may be further formed under the bank 162.

Next, a light-emitting layer 170 is formed on the first electrode 160 exposed by the bank 162.

Although not shown in the figure, the light-emitting layer 170 may include a first charge auxiliary layer, a light-emitting material layer and a second charge auxiliary layer sequentially disposed on the first electrode 160. The light-emitting material layer may be formed of any one of red, green and blue luminescent materials, but is not limited thereto. The luminescent material may be an organic luminescent material such as a phosphorescent compound or a fluorescent compound or may be an inorganic luminescent material such as a quantum dot.

The first charge auxiliary layer may be a hole auxiliary layer, and the hole auxiliary layer may include at least one of a hole injecting layer (HIL) and a hole transporting layer (HTL). In addition, the second charge auxiliary layer may be an electron auxiliary layer, and the electron auxiliary layer may include at least one of an electron injecting layer (EIL) and an electron transporting layer (ETL). However, the present disclosure is not limited thereto, and other variations are possible.

Here, the light-emitting layer 170 may be formed through a solution process. Thus, the process may be simplified and a display device with a large size and high resolution may be provided. A spin coating method, an ink jet printing method, or a screen printing method may be used as the solution process, but the present disclosure is not limited thereto and other variations are possible. When the solution is dried, a drying speed of a solvent in a region adjacent to the bank 162 is different from that in other regions. Therefore, a height of the light-emitting layer 170 in the region adjacent to the bank 162 may rise as it gets closer to the bank 162.

Alternatively, the light-emitting layer 170 may be formed through a vacuum evaporation process, or the light-emitting layer 170 may be formed through a mix of a solution process and a vacuum evaporation process.

A second electrode 180 of a conductive material having a relatively low work function is formed on the light-emitting layer 170 substantially all over the insulation substrate 110. The second electrode 180 may be formed of aluminum (Al), magnesium (Mg), silver (Ag), or an alloy thereof. The second electrode 180 may have a relatively thin thickness such that light from the light-emitting layer 170 may be transmitted therethrough. Alternatively, the second electrode 180 may be formed of a transparent conductive material such as indium-gallium-oxide (IGO), but is not limited thereto.

The first electrode 160, the light-emitting layer 170 and the second electrode 180 constitute a light-emitting diode De. The first electrode 160 may serve as an anode, and the second electrode 180 may serve as a cathode, but is not limited thereto.

As described above, the display device 100 according to the first aspect of the present disclosure may be a top emission type in which light from the light-emitting layer 170 of the light-emitting diode De is output toward a direction opposite the insulation substrate 110, that is, output to the outside through the second electrode 180. The top emission type display device may have a wider emission area than a bottom emission type display panel of the same size, to thereby improve luminance and reduce power consumption.

At this time, the light-emitting diode De of each subpixel region may have an element thickness for a micro-cavity effect corresponding to a wavelength of the emitted light, thereby increasing the light efficiency.

Next, an encapsulation layer 190 may be formed on the second electrode 180 substantially all over the insulation substrate 110 to block moisture or oxygen introduced from the outside, thereby protecting the light-emitting diode De. The encapsulation layer 190 may be formed of UV curable sealant or frit sealant. Alternatively, the encapsulation layer 190 may include inorganic layers and organic layers alternately stacked.

Meanwhile, the display panel 100 according to the first aspect of the present disclosure may further include a polarizing plate 192 on the encapsulation layer 190. The polarizing plate 192 may be a circular polarizing plate which includes a linear polarizer and a quarter wave plate and converts linearly polarized light into circularly polarized light or circularly polarized light into linearly polarized light. The polarizing plate 192 blocks external light from being reflected by the display panel 100 and then output, thereby improving a contrast ratio.

Figure 3:
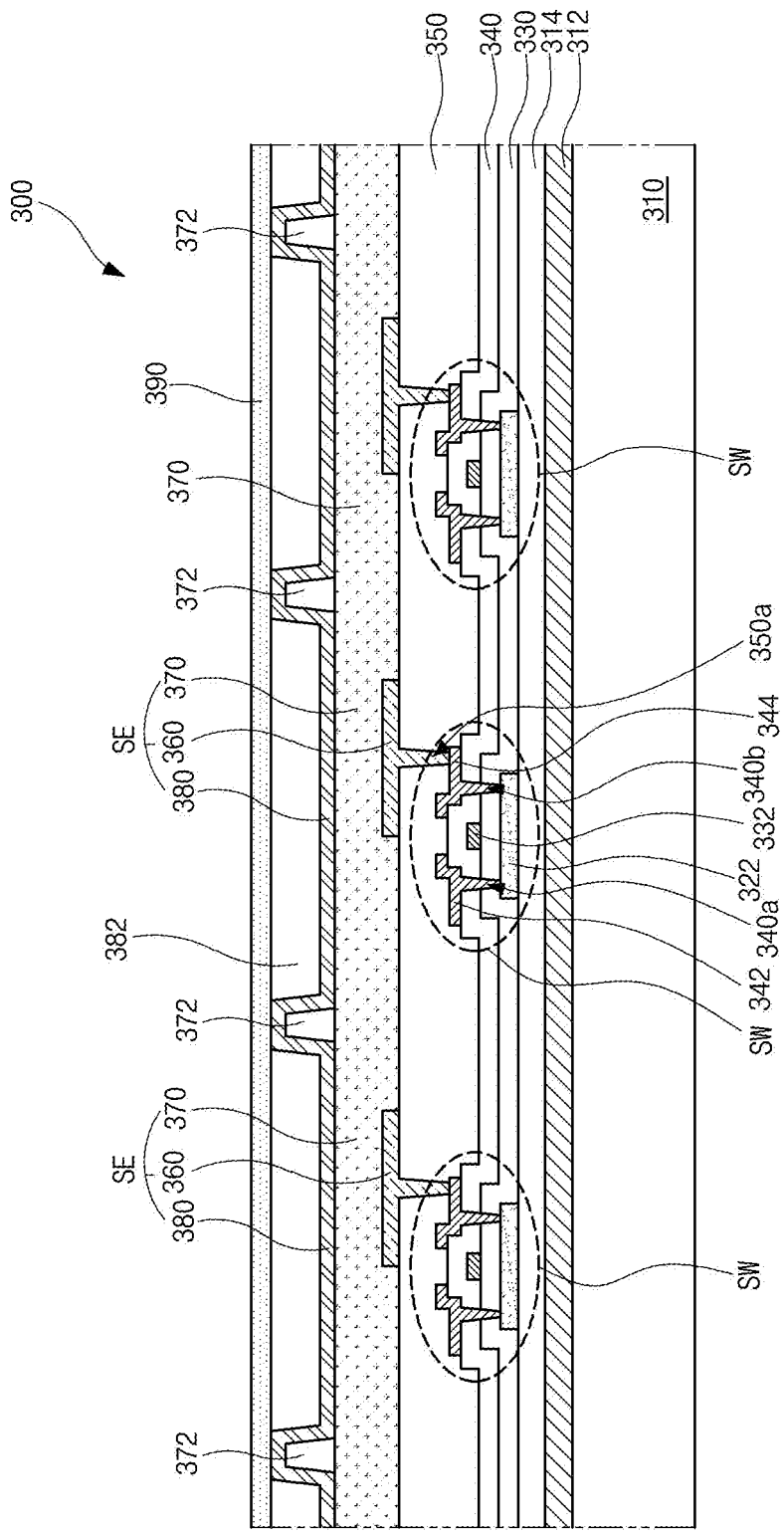
FIG. 3 is a schematic cross-sectional view of a sensor panel according to the first aspect of the present disclosure.

FIG. 3 is a schematic cross-sectional view of a sensor panel according to the first aspect of the present disclosure. As described above, the sensor panel 300 includes a plurality of sensors SE over a substrate 310. Each sensor SE is an ultrasonic sensor including a first sensor electrode 360, a piezoelectric layer 370 and a second sensor electrode 380.

More particularly, as shown in FIG. 3, a blocking layer 312 is formed on the substrate 310. The blocking layer 312 is formed substantially all over the substrate 310 and blocks an ultrasonic wave, which is generated from the sensor SE and progresses toward the substrate 310, from being reflected by the substrate 310 and returning to the sensor SE. The blocking layer 312 may absorb the ultrasonic wave generated from the sensor SE and progressing toward the substrate 310. For example, the blocking layer 312 may be formed of copper, but is not limited thereto.

Meanwhile, the substrate 310 is formed of an insulating material. The substrate 310 may be a glass substrate or a plastic substrate, but is not limited thereto.

An insulation layer 314 is formed on the blocking layer 312 substantially all over the substrate 310. The insulation layer 314 may be formed of an inorganic insulating material such as silicon oxide ($SiO_2$) or silicon nitride (SiNx), but is not limited thereto.

A patterned semiconductor layer 322 is formed on the insulation layer 314 corresponding to each sensor SE. The semiconductor layer 322 may be formed of polycrystalline silicon, and in this case, both ends of the semiconductor layer 322 may be doped with impurities. Alternatively, the semiconductor layer 322 may be formed of an oxide semiconductor material.

A gate insulation layer 330 of an insulating material is formed on the semiconductor layer 322 substantially all over the substrate 310. The gate insulation layer 330 may be formed of an inorganic insulating material such as silicon oxide ($SiO_2$) or silicon nitride (SiNx).

A gate electrode 332 of a conductive material such as metal is formed on the gate insulation layer 330 corresponding to a center of each semiconductor layer 322. In addition, a gate line (not shown) may be formed on the gate insulation layer 330. The gate line extends in a direction, and the gate electrode 332 is connected to the gate line.

For example, the gate electrode 332 and the gate line may be formed of one or more of aluminum (Al), molybdenum (Mo), titanium (Ti), nickel (Ni), chromium (Cr), copper (Cu) and their alloys and may have a single-layered structure or a multiple-layered structure, but is not limited thereto.

Meanwhile, in the first aspect of the present disclosure, although the gate insulation layer 330 is formed substantially all over the substrate 310, the gate insulation layer 330 may be patterned to have the same shape as the gate electrode 332.

An interlayer insulation layer 340 of an insulating material is formed on the gate electrode 332 substantially all over the substrate 310. The interlayer insulation layer 340 may be formed of an inorganic insulating material such as silicon oxide ($SiO_2$) or silicon nitride (SiNx) or an organic insulating material such as photo acryl or benzocyclobutene.

The interlayer insulation layer 340 has first and second contact holes 340a and 340b exposing top surfaces of the both ends of each semiconductor layer 322. The first and second contact holes 340a and 340b are disposed at both sides of the gate electrode 332 and are spaced apart from the gate electrode 332. Here, the first and second contact holes 340a and 340b are formed in the gate insulation layer 330. Alternatively, when the gate insulation layer 330 is patterned to have the same shape as the gate electrode 332, the first and second contact holes 340a and 340b are formed only in the interlayer insulation layer 340.

Source and drain electrodes 342 and 344 of a conductive material such as metal are formed on the interlayer insulation layer 340. In addition, a data line (not shown) may be formed on the interlayer insulation layer 340.

For example, the source and drain electrodes 342 and 344 and the data line may be formed of one or more of aluminum (Al), molybdenum (Mo), titanium (Ti), nickel (Ni), chromium (Cr), copper (Cu) and their alloys and may have a single-layered structure or a multiple-layered structure, but is not limited thereto.

The source and drain electrodes 342 and 344 are spaced apart from each other with the gate electrode 332 disposed therebetween. The source and drain electrodes 342 and 344 contact the both ends of the semiconductor layer 322 through the first and second contact holes 340a and 340b, respectively. Although not shown in the figure, the data line extends in a direction and crosses the gate line.

The semiconductor layer 322, the gate electrode 332, and the source and drain electrodes 342 and 344 constitute a thin film transistor SW as a switching element. Here, the thin film transistor SW may have a coplanar structure in which the gate electrode 332 and the source and drain electrodes 342 and 344 are disposed at one side of the semiconductor layer 322, that is, over the semiconductor layer 322, but is not limited thereto.

Meanwhile, one or more thin film transistors having the same structure as the thin film transistor SW may be further formed to correspond to each sensor SE. In addition, a CMOS (complementary metal oxide semiconductor) element having the same or similar structure as the thin film transistor SW may be further formed on the substrate 310.

An overcoat layer 350 of an insulating material is formed on the source and drain electrodes 342 and 344 substantially all over the insulation substrate 310. The overcoat layer 350 may be formed of an organic insulating material such as photo acryl or benzocyclobutene. The overcoat layer 150 may have a flat top surface.

Furthermore, although not shown in the figure, an inorganic insulation layer may be further formed under the overcoat layer 350, that is, between the overcoat layer 350 and the thin film transistor SW. The inorganic insulation layer may be formed of silicon oxide ($SiO_2$) or silicon nitride (SiNx).

The overcoat layer 350 has a drain contact hole 350a exposing the drain electrode 344. Here, the drain contact hole 350a may be spaced apart from the second contact hole 340b. Alternatively, the drain contact hole 350a may be formed directly over the second contact hole 340b.

The first sensor electrode 360 of a conductive material is patterned and formed on the overcoat layer 350 corresponding to each sensor SE. The first sensor electrode 360 contacts the drain electrode 344 through the drain contact hole 350a. For example, the first sensor electrode 360 may be formed of indium tin oxide (ITO), copper (Cu) or a molybdenum-titanium (Mo—Ti) alloy, but is not limited thereto.

The piezoelectric layer 370 is formed on the first sensor electrode 360 substantially all over the substrate 310.

The piezoelectric layer 370 may be formed of a piezoelectric material that generates electrical energy by causing deformation of the material due to external mechanical energy and generates deformation of the material by electrical energy. The piezoelectric layer 370 may be formed by coating or printing an ink including a piezoelectric material. The piezoelectric material may be a piezoelectric polymer, piezoelectric ceramic or an organic-inorganic complex.

For example, the piezoelectric polymer may be PVDF (polyvinylidene fluoride), P(VDF-TrFE)(polyvinylidene fluoride-co-trifluoroethylene), P(VDF-TrFE-CFE)(poly(vinylidene fluoride-co-triluoroethylene-chlorofluoroethylene), P(VDF-TrFE-CTFE)(poly(vinylidene fluoride-co-triluoroethylene-chlorotrifluoroethylene), PVDF doped with carbon nanotubes, or a phosphazene-based polymer, but is not limited thereto. Here, poly bis(trifluoroethoxy) phosphazene may be used as the phosphazene-based polymer.

In addition, the piezoelectric ceramic may be $PbZrTiO_3$ (PZT, Lead Zirconium Titanate), $Pb(MgNb)$—$PbZrTiO_3$, PNN-PT ($Pb(NiNb)$—$PbTiO_3$), or PLZT ($PbLaZrTiO_3$). Alternatively, the piezoelectric ceramic may be a lead-free piezoelectric material such as $BaTiO_3$ (BTO, barium Titanate) or $KNaNbO_3$ (KNN, kalium natrium niobate).

Meanwhile, the organic-inorganic complex may include the above-mentioned piezoelectric ceramic and a polymer. Here, the polymer may be one of the piezoelectric polymers described above or may be a non-piezoelectric polymer such as epoxy, polyimide or polyurethane.

The piezoelectric layer 370 may have a thickness of 0.5 μm to 80 μm, beneficially, a thickness of 1 μm to 50 μm, and more beneficially, a thickness of 5 μm to 10 μm. If the thickness of the piezoelectric layer 370 is smaller than 0.5 μm, it is difficult to generate an ultrasonic wave. If the thickness of the piezoelectric layer 370 is larger than 80 μm, a high voltage is required to generate an ultrasonic wave, and receiving sensitivity is lowered.

A partition wall 372 of an insulating material is formed on the piezoelectric layer 370. The partition wall 372 is formed between adjacent sensors SE, that is, between adjacent first sensor electrodes 360.

The partition wall 372 has a lower dielectric constant than the piezoelectric layer 370, thereby blocking an electric field between the sensors SE. For example, the dielectric constant of the partition wall 372 may be larger than 1.0 and smaller than 2.0, and beneficially, larger than 1.0 and smaller than 1.5.

Here, the partition wall 372 is spaced apart from the first sensor electrode 360. In addition, the partition wall 372 may be disposed between adjacent thin film transistors SW and spaced apart from the thin film transistors SW. Alternatively, the partition wall 372 may partially overlap the thin film transistor SW.

The partition wall 372 may be formed by coating a polymer material and then patterning it or by printing a polymer material. For example, the partition wall 372 may be formed of a polyimide-based compound, a polydimethylsiloxane-based compound, a polyacryl-based polymer, or a polyurethane-based polymer, but is not limited thereto.

The second sensor electrode 380 is formed on the partition wall 372 substantially all over the substrate 310. The second sensor electrode 380 covers the partition wall 372 and contacts a top surface and side surfaces of the partition wall 372. Further, the second sensor electrode 380 contacts the piezoelectric layer 370 between the partition walls 370.

Here, the first sensor electrode 360 and the second sensor electrode 380 overlapping each other and the piezoelectric layer 370 therebetween constitute each sensor SE. As described above, each sensor SE is an ultrasonic sensor.

The second sensor electrode 380 may be formed by depositing indium tin oxide (ITO) or a molybdenum-titanium (MoTi) alloy through a sputtering method or applying a silver ink through a coating method, but is not limited thereto. Here, a thickness of the second sensor electrode 380 formed through a sputtering method may be smaller than a thickness of the second sensor electrode 380 formed through a coating method. It is advantageous for receiving sensitivity of the sensor that the second sensor electrode 380 has a smaller thickness because a distance between the sensor SE and the display panel 100 of FIG. 1 is reduced.

A passivation layer 382 is formed on the second sensor electrode 380. Since the second sensor electrode 380 has a smaller thickness than the partition wall 372, a top surface of the second sensor electrode 380 has a step difference due to the partition wall 372, and the passivation layer 382 covers the step difference.

Here, the passivation layer 382 may be formed only on the second sensor electrode 382 between adjacent partition walls 372. At this time, a top surface of the passivation layer 382 is flush with the top surface of the second sensor electrode 380.

Alternatively, the passivation layer 382 may be formed on the second sensor electrode 380 on the top surface of the partition wall 372 as well as between the partition walls 372. In this case, the passivation layer 382 has a flat top surface, and a thickness of the passivation layer 382 on the sensor SE is thicker than a thickness of the passivation layer 382 on the partition wall 372.

The passivation layer 382 may be formed of an organic insulating material. For example, the passivation layer 382 may be formed of a polyimide-based compound or acryl-based compound, but is not limited thereto.

An adhesive layer 390 is formed on the passivation layer 382 substantially all over the substrate 310. When the passivation layer 382 is formed only on the second sensor electrode 380 between the partition walls 372, the adhesive layer 390 contacts the passivation layer 382 and the second sensor electrode 380.

Alternatively, when the passivation layer 382 is formed on the second sensor electrode 380 on the partition wall 372 as well as between the partition walls 372, the adhesive layer 390 contacts only the passivation layer 382.

The adhesive layer 390 may be formed of an organic material, an inorganic material or a mixture of an organic material and an inorganic material. For example, epoxy or optically clear adhesive (OCA) may be used for the adhesive layer 390, but is not limited thereto.

The sensor panel 300 is attached to the display panel 100 of FIG. 1 through the adhesive layer 390. Here, the adhesive layer 390 is included in the sensor panel 300. However, the adhesive layer 390 may be included in the display panel 100 of FIG. 1.

An information detection process using a display device including the sensor panel 300 will be described with reference to the drawings.

Figure 4:
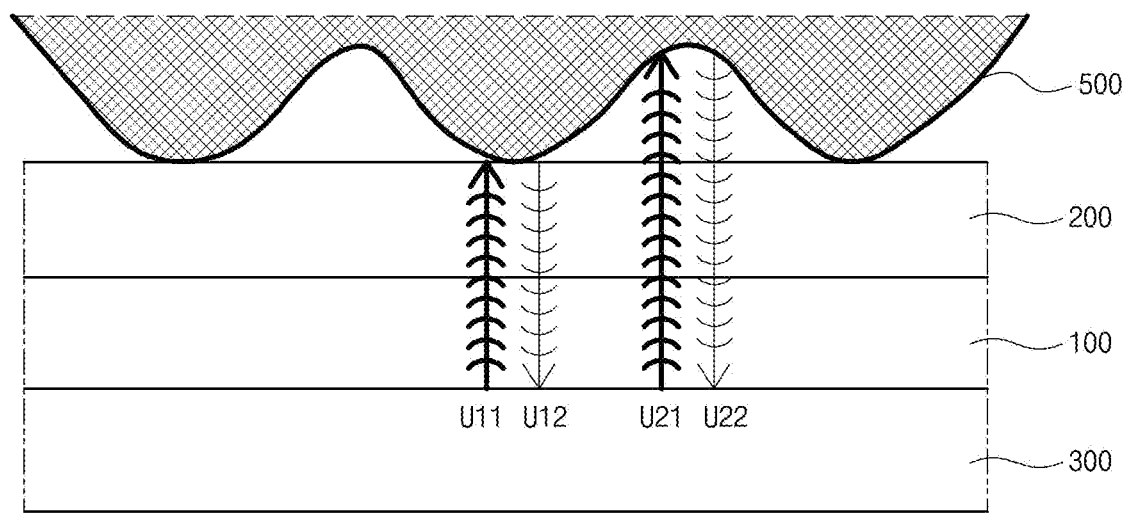
FIG. 4 is a schematic cross-sectional view of explaining an information detection process using a display device according to the first aspect of the present disclosure.

FIG. 4 is a schematic cross-sectional view of explaining an information detection process using a display device according to the first aspect of the present disclosure, and the sensor panel of FIG. 3 will be also referred to.

As shown in FIG. 3 and FIG. 4, in the display device according to the first aspect of the present disclosure, the cover window 200 is attached to an upper surface of the display panel 100, and the sensor panel 300 is attached to a lower surface of the display panel 100. At this time, the sensors SE of the sensor panel 300 are disposed between the display panel 100 and the substrate 310 of the sensor panel 300, and the thin film transistor SW is disposed between the sensors SE and the substrate 310.

Meanwhile, a target object 500 is disposed on the cover window 200. That is, the target object 500 is disposed on an upper surface cover window 200. For example, the target object 500 may be a fingerprint of a finger having mountains and valleys, but is not limited thereto. Here, the mountains of the target object 500 contact the cover window 200 of the display device, and the valley of the target object 500 are spaced apart from the cover window 200 such that another material layer such as an air layer or a moisture layer is disposed between the valleys and the cover window 200. In the present disclosure, an example in which the air layer is disposed will be described.

A voltage is applied to the sensors SE of the sensor panel 300 from the sensor driving part 420, and the sensors SE of the sensor panel 300 generate ultrasonic waves U11 and U21. At this time, the voltage applied to the sensors SE is an AC (alternating current) voltage. The piezoelectric layer 370 of the sensors SE is vibrated by the applied AC voltage, and thus the ultrasonic waves U11 and U21 are generated.

The generated ultrasonic waves U11 and U21 pass through the display panel 100 and the cover window 200 and are transmitted to the target object 500. Then, the ultrasonic waves U11 and U21 transmitted to the target object 500 are reflected by the target object 500, and the reflected ultrasonic waves U12 and U22 pass through the cover window 200 and the display panel 100 and are transmitted to the sensor panel 300. The sensors SE of the sensor panel 300 receive the reflected ultrasonic waves U12 and U22 to thereby generate voltages. The sensor driving part 420 of FIG. 1 receives the voltages generated from the sensors SE and detects information about the target object 500 by calculating a distance between the target object 500 and the sensors SE.

At this time, the intensity of the ultrasonic wave U12 reflected by the mountain of the target object 500 is different from that of the ultrasonic wave U22 reflected by the valley of the target object 500. Namely, the ultrasonic waves U11, U12, U21 and U22 are reflected, absorbed or refracted while passing through a medium, so that their intensities decrease. Since the ultrasonic waves U21 and U22 corresponding to the valley of the target object 500 further pass through the air layer as compared with the ultrasonic waves U11 and U12 corresponding to the mountain of the target object 500, the intensity of the ultrasonic wave U12 reflected by the mountain of the target object 500 is greater than the intensity of the ultrasonic wave U22 reflected by the valley of the target object 500.

Accordingly, the sensors SE of the sensor panel 300 generate different voltages to correspond to the reflected ultrasonic waves U12 and U22 having different intensities, and the sensor driving part 420 of FIG. 1 detects information such as a shape of the target object 500 from these voltages.

As described above, in the display device according to the first aspect of the present disclosure, since the sensors SE of the sensor panel 300 recognize the target object in a three-dimensional method by using ultrasonic waves, the security is superior to the capacitive or optical sensor which recognizes a target object in a two-dimensional method.

In the display device according to the first aspect of the present disclosure, the sensors SE are disposed between the display panel 100 of FIG. 1 and the substrate 310, and thus it is possible to minimize attenuation and refraction of the ultrasonic waves by reducing the distance between the display panel 100 of FIG. 1 and the sensors SE. Therefore, the receiving sensitivity of the sensors SE increases and the recognition rate increases, thereby improving the sensing accuracy.

In addition, in the display device according to the first aspect of the present disclosure, the partition wall 372 between adjacent sensors SE supports the sensor panel 300. When the sensor panel 300 is attached to the display panel 100 of FIG. 1, the electrodes and the piezoelectric material of the sensors SE are prevented from being damaged, and it is possible to minimize the deformation of the piezoelectric material due to external pressure such as touch.

At this time, as the thickness of the partition wall 372 increases, the distance between the sensors SE and the display panel 100 of FIG. 1 increases, and the receiving sensitivity of the sensors SE decreases. Thus, it is beneficial that the partition wall 372 has a thickness of 0.5 μm to 10 μm.

In the meantime, the partition wall 372 blocks the ultrasonic waves generated and received by the specific sensor SE from progressing to another sensor SE adjacent to the specific sensor SE through reflection and refraction, thereby optimizing the progressing path of the ultrasonic waves and further increasing the sensing accuracy.

At this time, as modulus increases, the ultrasonic waves progress well. In order to effectively block the ultrasonic waves, it is desirable that partition wall 372 has a relatively low modulus. On the other hand, the passivation layer 382 disposed on the sensors SE has a relatively high modulus so that the ultrasonic waves progress well. Accordingly, the modulus of the partition wall 372 is smaller than the modulus of the passivation layer 382. For example, the modulus of the partition wall may be $10^5$ to $10^6$ Pa, and the modulus of the passivation layer 382 may be $10^7$ to $10^9$ Pa, but is not limited thereto.

In addition, as stated above, the partition wall 372 has a lower dielectric constant than the piezoelectric layer 370, and the partition wall 372 blocks the electric field between the first sensor electrode 360 and the second sensor electrode 380. Accordingly, the partition wall 372 can prevent unwanted ultrasonic waves from being generated in a region other than the sensors SE.

A planar arrangement structure of the partition wall in the first aspect of the present disclosure will be described with reference to FIG. 5.

Figure 5:
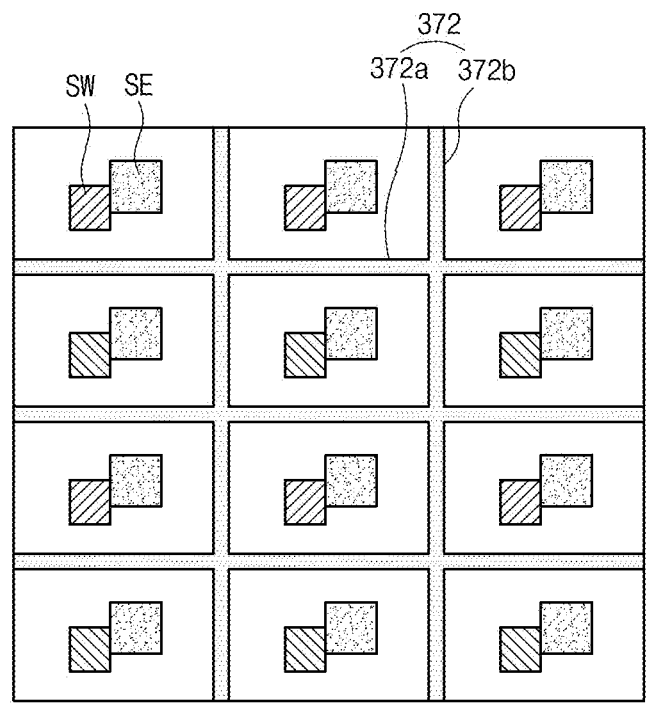
FIG. 5 is a schematic plan view of a sensor panel according to the first aspect of the present disclosure.

FIG. 5 is a schematic plan view of a sensor panel according to the first aspect of the present disclosure and shows transistors, sensors and a partition wall.

In FIG. 5, a plurality of thin film transistors SW are arranged in a matrix shape along a first direction and a second direction perpendicular to the first direction. A plurality of sensors SE, which are connected to the plurality of thin film transistor SW, respectively, are arranged in a matrix shape along the first direction and the second direction. A partition wall 372 is disposed between adjacent sensors SE. Here, the first direction may correspond to a vertical direction, and the second direction may correspond to a horizontal direction in the figure.

More specifically, the partition wall 372 includes a first pattern 372a and a second pattern 372b. The first pattern 372a of the partition wall 372 is disposed between adjacent sensors SE along the first direction, and the second pattern 372b of the partition wall 372 is disposed between adjacent sensors SE along the second direction. The first pattern 372a extends in the second direction, the second pattern 372b extends in the first direction, and the first and second patterns 372a and 372b cross each other. Accordingly, the partition wall 372 may have a mesh structure, and each sensor SE may be surrounded by the partition wall 372.

Alternatively, the partition wall is not formed in a region where the sensors SE are relatively far from each other, so that the partition wall may be formed in a line shape.

Here, the partition wall 372 is spaced apart from the sensors SE and the thin film transistors SW. Alternatively, the partition wall 372 may be spaced apart from the sensors SE and overlap the thin film transistors SW.

Figure 6:
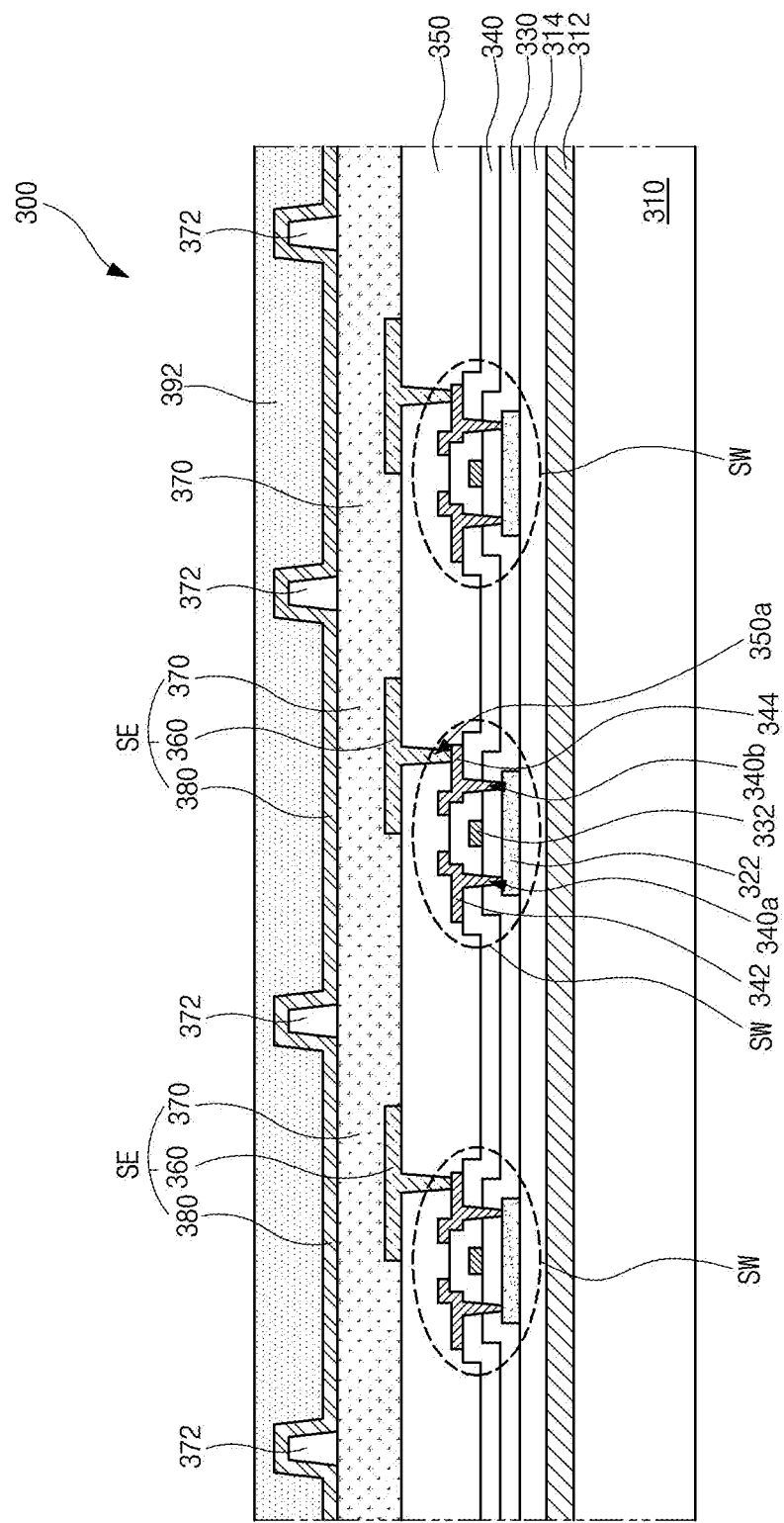
FIG. 6 is a schematic cross-sectional view of a sensor panel according to a second aspect of the present disclosure.

FIG. 6 is a schematic cross-sectional view of a sensor panel according to a second aspect of the present disclosure. The sensor panel of FIG. 6 has the same structure as that of the first aspect except for configurations on the sensors SE. The same parts will be designated by the same reference signs, and explanation for the same parts will be shortened or omitted.

In FIG. 6, the blocking layer 312 and the insulation layer 314 are formed sequentially on the substrate 310, the thin film transistors SW, which are a switching element, are formed on the insulation layer 314, and the overcoat layer 350 is formed on the thin film transistors SW.

The first sensor electrode 360 of a conductive material is patterned and formed on the overcoat layer 350 corresponding to each sensor SE. The first sensor electrode 360 is connected to the drain electrode 344 of the corresponding thin film transistor SW.

The piezoelectric layer 370 of a piezoelectric material is formed on the first sensor electrode 360 substantially all over the substrate 310. Here, the piezoelectric layer 370 may have a thickness of 0.5 μm to 80 μm, beneficially, a thickness of 1 μm to 50 μm, and more beneficially, a thickness of 5 μm to 10 μm.

The partition wall 372 of an insulating material is formed on the piezoelectric layer 370. The partition wall 372 is formed between adjacent sensors SE, that is, between adjacent first sensor electrodes 360.

The partition wall 372 has a lower dielectric constant than the piezoelectric layer 370, thereby blocking an electric field between the sensors SE. For example, the dielectric constant of the partition wall 372 may be larger than 1.0 and smaller than 2.0, and beneficially, larger than 1.0 and smaller than 1.5. Further, in order to prevent a decrease in the receiving sensitivity of the sensor SE, it is beneficial that the partition wall 372 has a thickness of 0.5 μm to 10 μm.

The second sensor electrode 380 is formed on the partition wall 372 substantially all over the substrate 310. The second sensor electrode 380 covers the partition wall 372 and contacts a top surface and side surfaces of the partition wall 372. In addition, the second sensor electrode 380 contacts the piezoelectric layer 370 between the partition walls 370.

Here, the first sensor electrode 360 and the second sensor electrode 380 overlapping each other and the piezoelectric layer 370 therebetween constitute each sensor SE. As described above, each sensor SE is an ultrasonic sensor.

An adhesive layer 392 is formed on the second sensor electrode 380 substantially all over the substrate 310. Since the second sensor electrode 380 has a smaller thickness than the partition wall 372, a top surface of the second sensor electrode 380 has a step difference due to the partition wall 372, and the adhesive layer 392 covers the step difference.

At this time, the adhesive layer 392 is also formed on the top surface of partition wall 372 and has a flat top surface. A thickness of the adhesive layer 392 between adjacent partition walls 372, that is, on the sensor SE is thicker than a thickness of the adhesive layer 392 on the partition wall 372.

The adhesive layer 392 may be formed of an organic material, an inorganic material or a mixture of an organic material and an inorganic material. For example, epoxy or optically clear adhesive (OCA) may be used for the adhesive layer 390, but is not limited thereto.

Meanwhile, since the adhesive layer 392 is formed relatively thick on the sensor SE, the adhesive layer 392 may have relatively high modulus such that the ultrasonic waves progress well. At this time, it is desirable that the modulus of the adhesive layer 392 is greater than the modulus of the partition wall 372.

The sensor panel 300 is attached to the display panel 100 of FIG. 1 through the adhesive layer 392.

As described above, in the second aspect of the present disclosure, since the adhesive layer 372 covers the step difference due to the partition wall 372, the passivation layer can be omitted, thereby reducing the manufacturing processes and costs as compared with the first aspect.

Meanwhile, in the present disclosure, an arrangement of the partition wall varies according to an arrangement of the thin film transistors and the sensors. Planar arrangement structures of the partition wall according to other aspects of the present disclosure will be described with reference to FIG. 7 and FIG. 8.

Figure 7:
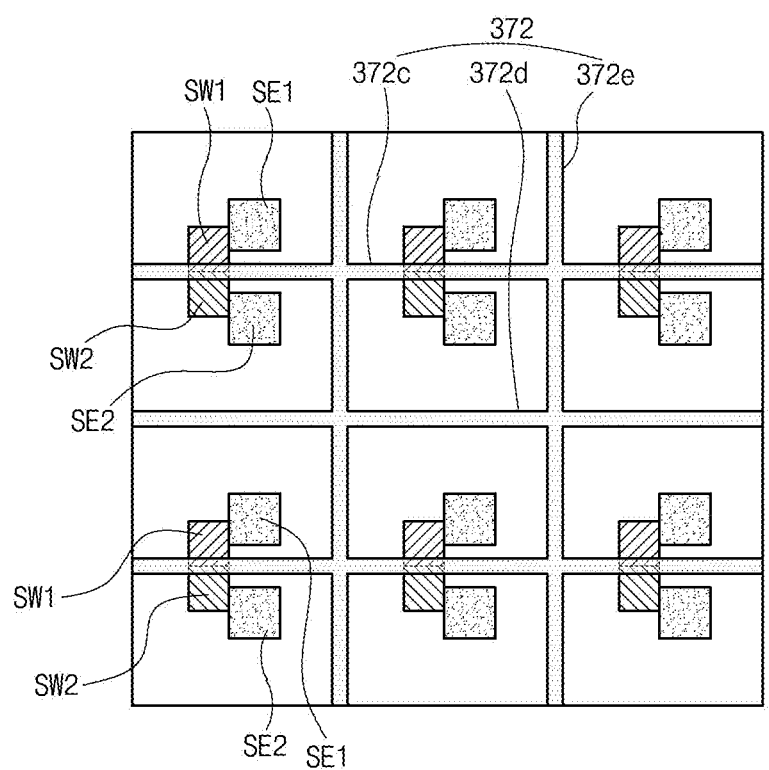
FIG. 7 and FIG. 8 are schematic plan views of a sensor panel according to other aspects of the present disclosure and show transistors, sensors and a partition wall.
Figure 8:
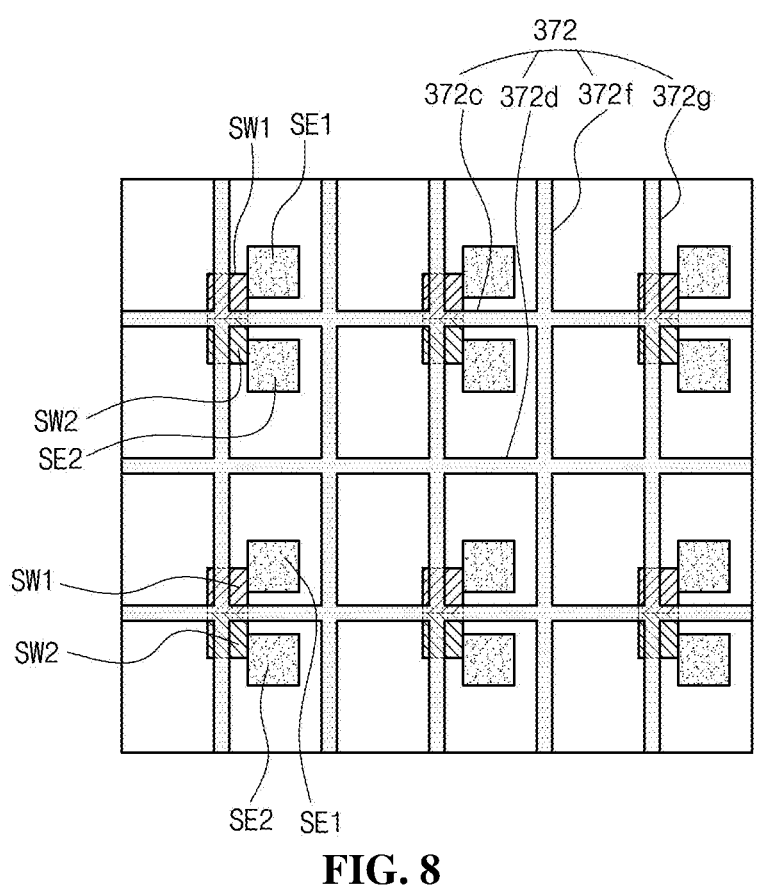

FIG. 7 and FIG. 8 are schematic plan views of a sensor panel according to other aspects of the present disclosure and show transistors, sensors and a partition wall.

In FIG. 7 and FIG. 8, a plurality of first and second thin film transistors SW1 and SW2 are arranged in a matrix shape along a first direction and a second direction perpendicular to the first direction. At this time, a first thin film transistor SW1 and a second thin film transistor SW2 are connected to each other along the first direction. Here, the first direction may correspond to a vertical direction, and the second direction may correspond to a horizontal direction in the figure.

A plurality of first and second sensors SE1 and SE2 are arranged in a matrix shape along the first direction and the second direction. Here, the first sensor SE1 is connected to the first thin film transistor SW1, and the second sensor SE2 is connected to the second thin film transistor SW2. The first and second sensors SE1 and SE2, which are connected to the first and second thin film transistors SW1 and SW2 connected to each other along the first direction, respectively, are spaced apart from each other along the first direction.

In the meantime, the partition wall 372 is disposed between adjacent sensors SE1 and SE2.

More specifically, referring to FIG. 7, the partition wall 372 includes a first pattern 372c, a second pattern 372d and a third pattern 372e. The first pattern 372c and the second pattern 372d are disposed between the first sensor SE1 and the second sensor SE2 adjacent along the first direction, and the third pattern 372e is disposed between the first sensor SE1 and the second sensor SE2 adjacent along the second direction. The first pattern 372c and the second pattern 372d extend in the second direction and are parallel to each other. The third pattern 372e extends in the first direction and crosses the first and second patterns 372c and 372d.

At this time, the first pattern 372c is disposed between the first and second thin film transistors SW1 and SW2 connected to each other along the first direction and overlaps the first and second thin film transistors SW1 and SW2. The second pattern 372d is disposed between the first and second thin film transistors SW1 and SW2 spaced apart from each other along the first direction and is spaced apart from the first and second thin film transistors SW1 and SW2. Accordingly, the partition wall 372 may have a mesh structure, and each sensor SE1 and SE2 may be surrounded by the partition wall 372.

On the other hand, referring to FIG. 8, the partition wall 372 includes a first pattern 372c, a second pattern 372d, a third pattern 372f and a fourth pattern 372g. The first pattern 372c and the second pattern 372d are disposed between the first sensor SE1 and the second sensor SE2 adjacent along the first direction, and the third pattern 372f and the fourth pattern 372g are disposed between the first sensor SE1 and the second sensor SE2 adjacent along the second direction. The first pattern 372c and the second pattern 372d extend in the second direction and are parallel to each other. The third pattern 372f and the fourth pattern 372g extend in the first direction and are parallel to each other. The third pattern 372f and the fourth pattern 372g cross the first and second patterns 372c and 372d.

At this time, the first pattern 372c is disposed between the first and second thin film transistors SW1 and SW2 connected to each other along the first direction and overlaps the first and second thin film transistors SW1 and SW2. The second pattern 372d is disposed between the first and second thin film transistors SW1 and SW2 spaced apart from each other along the first direction and is spaced apart from the first and second thin film transistors SW1 and SW2. In addition, the third pattern 372f is disposed between the first sensors SE1 and between the second sensors SE2 adjacent along the second direction and is spaced apart from the first and second thin film transistors SW1 and SW2. The fourth pattern 372g is disposed between the first sensors SE1 and between the second sensors SE2 adjacent along the second direction and overlaps the first and second thin film transistors SW1 and SW2. Here, the fourth pattern 372g is disposed between the third patterns 372f and the first and second sensors SE1 and SE2. Accordingly, the partition wall 372 may have a mesh structure, and each sensor SE1 and SE2 may be surrounded by the partition wall 372.

As described above, when the distance between adjacent sensors SE1 and SE2 is relatively far, the number of partition walls 372 disposed between adjacent sensors SE1 and SE2 may be increased, and the arrangement of the partition wall 372 is not limited to the illustrated configuration.

The sensor panel of the present disclosure can be applied to a display device in various sizes, and this will be described with reference to FIG. 9 and FIG. 10.

Figure 9:
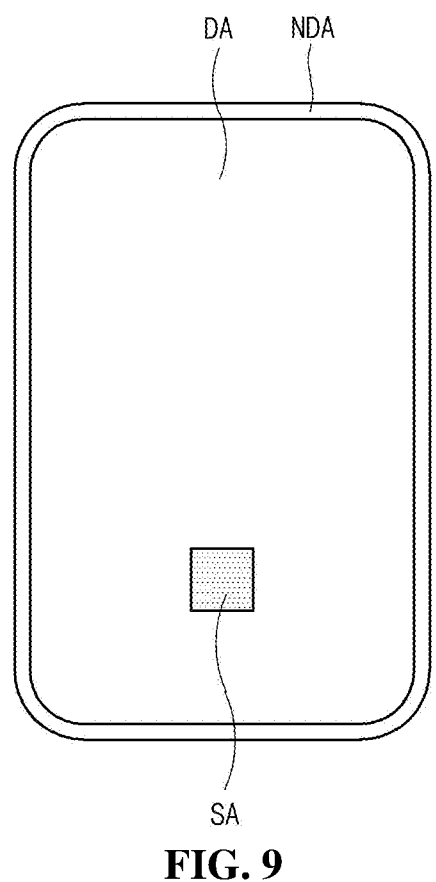
FIG. 9 and FIG. 10 are views schematically illustrating a display device including a sensor panel according to the aspects of the present disclosure.
Figure 10:
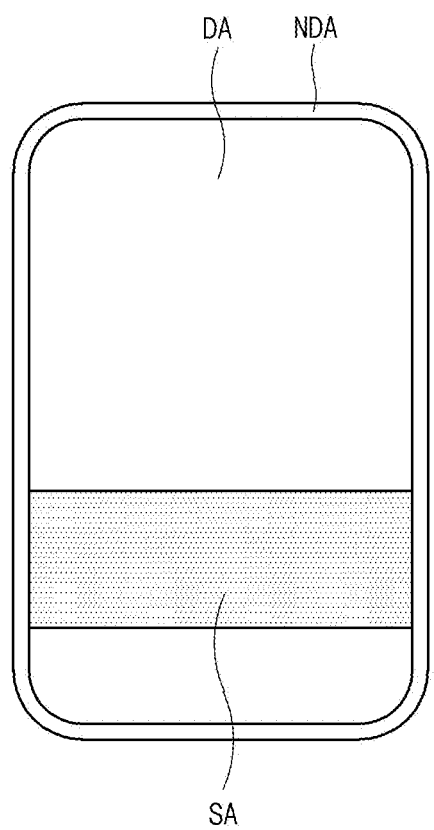

FIG. 9 and FIG. 10 are views schematically illustrating a display device including a sensor panel according to the aspects of the present disclosure.

In FIG. 9 and FIG. 10, a display device according to the aspects of the present disclosure includes a display panel 100 of FIG. 1 having a display area DA and a non-display area NDA and a sensor panel 300 of FIG. 1 having a sensing area SA. The display panel 100 of FIG. 1 displays an image through the display area DA, and the non-display area NDA surrounds the display area DA. The non-display area NDA may at least surround at least one side of the display area DA.

Here, the sensing area SA is disposed on the display area DA. As shown in FIG. 9, the sensing area SA may have lengths of a horizontal direction and a vertical direction smaller than the display area DA. Alternatively, as shown in FIG. 10, the sensing area SA may have a length of the horizontal direction substantially the same as the display area DA and a length of the vertical direction smaller than the display area DA. However, the lengths of the sensing area SA are not limited thereto and may be configured in various ways as necessary.

The display device of the present disclosure has the excellent security by applying a sensor panel including an ultrasonic sensor to the display device.

At this time, by attaching the sensor panel to the display panel such that the ultrasonic sensor is adjacent to the display panel, the distance between the display panel and the ultrasonic sensor can be decreased to minimize the attenuation and refraction of the ultrasonic waves, and the recognition rate of the ultrasonic sensor can be increased to improve the sensing accuracy.

In addition, by providing the partition wall between adjacent ultrasonic sensors, when the sensor panel is attached to the display panel, the electrodes and the piezoelectric material of the ultrasonic sensor can be prevented from being damaged, and the deformation of the piezoelectric material due to the external pressure can be minimized.

Meanwhile, the partition wall can block the ultrasonic waves from progressing in an undesired direction, thereby optimizing the progressing path of the ultrasonic waves and further increasing the sensing accuracy.

Further, the partition wall has a lower dielectric constant than the piezoelectric layer and blocks the electric field in regions other than the ultrasonic sensor, thereby preventing unwanted ultrasonic waves from being generated.

It will be apparent to those skilled in the art that various modifications and variations may be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A sensor panel, comprising:
 a substrate;
 a sensing part disposed on the substrate and including a plurality of sensors; and
 a partition wall disposed between adjacent sensors,
 wherein each sensor includes a first sensor electrode, a piezoelectric layer and a second sensor electrode, and
 wherein the partition wall has a dielectric constant lower than the piezoelectric layer.

2. The sensor panel of claim 1, wherein the plurality of sensors generates and senses an ultrasonic wave.

3. The sensor panel of claim 1, wherein the partition wall is disposed between the piezoelectric layer and the second sensor electrode.

4. The sensor panel of claim 3, further comprising a passivation layer disposed on the second sensor electrode, wherein the passivation layer has a modulus greater than the partition wall.

5. The sensor panel of claim 4, wherein the passivation layer is disposed on the second sensor electrode between adjacent partition walls, and a top surface of the passivation layer is flush with a top surface of the second sensor electrode.

6. The sensor panel of claim 5, further comprising an adhesive layer disposed on the passivation layer,
wherein the adhesive layer contacts the passivation layer and the second sensor electrode.

7. The sensor panel of claim 4, wherein the passivation layer is disposed on the second sensor electrode between adjacent partition walls and on the second sensor electrode on a top surface of the partition wall, and
wherein the passivation layer has a flat top surface.

8. The sensor panel of claim 3, further comprising an adhesive layer disposed on the second sensor electrode,
wherein the adhesive layer has a modulus greater than the partition wall.

9. The sensor panel of claim 8, wherein the adhesive layer is disposed on the second sensor electrode between adjacent partition walls and on the second sensor electrode on a top surface of the partition wall, and
wherein a thickness of the adhesive layer between the adjacent partition walls is greater than a thickness of the adhesive layer over the top surface of the partition wall.

10. The sensor panel of claim 1, wherein the partition wall includes a plurality of patterns parallel to and spaced apart from each other between the adjacent sensors.

11. The sensor panel of claim 1, wherein the partition wall has a thickness in a range between 0.5 μm and 10 μm.

12. The sensor panel of claim 1, wherein the partition wall is formed of one of a polyimide-based compound, a polydimethylsiloxane-based compound, a polyacryl-based polymer and a polyurethane-based polymer.

13. The sensor panel of claim 1, further comprising a plurality of thin film transistors disposed between the substrate and the plurality of sensors,
wherein the first sensor electrodes of the plurality of sensors are connected to the plurality of thin film transistors, respectively.

14. A display device, comprising:
a sensor panel including:
a substrate;
a sensing part disposed on the substrate and including a plurality of sensors; and
a partition wall disposed between adjacent sensors,
wherein each sensor includes a first sensor electrode, a piezoelectric layer and a second sensor electrode, and the partition wall has a dielectric constant lower than the piezoelectric layer; and
a display panel on the sensor panel,
wherein the sensing part is disposed between the substrate and the display panel.

15. The display device of claim 14, wherein the display panel is an electroluminescent display panel that includes an insulation substrate and a light-emitting diode on the insulation substrate.

16. The display device of claim 14, wherein the partition wall is disposed between the piezoelectric layer and the second sensor electrode.

17. The display device of claim 16, wherein the sensor panel further includes a passivation layer on the second sensor electrode, and
wherein the passivation layer has a greater modulus than the partition wall.

18. The display device of claim 17, wherein the passivation layer is disposed on the second sensor electrode between adjacent partition walls, and a top surface of the passivation layer is flush with a top surface of the second sensor electrode.

19. The display device of claim 18, wherein the sensor panel further includes an adhesive layer disposed on the passivation layer, and
wherein the adhesive layer contacts the passivation layer and the second sensor electrode.

20. The display device of claim 16, wherein the sensor panel further includes an adhesive layer disposed on the second sensor electrode, and
wherein the adhesive layer has a modulus greater than the partition wall.

\* \* \* \* \*